US012701352B2

(12) United States Patent
Zhang

(10) Patent No.: US 12,701,352 B2
(45) Date of Patent: Aug. 4, 2026

(54) SOUND-PRODUCING APPARATUS, CALIBRATION METHOD FOR SOUND-PRODUCING APPARATUS, SOUND-PRODUCING UNIT AND HEADSET EQUIPMENT

(71) Applicant: GOERTEK INC., Weifang (CN)

(72) Inventor: Jian Zhang, Weifang (CN)

(73) Assignee: GOERTEK INC., Weifang (CN)

( * ) Notice: Subject to any disclaimer, the term of this patent is extended or adjusted under 35 U.S.C. 154(b) by 173 days.

(21) Appl. No.: 18/646,933

(22) Filed: Apr. 26, 2024

(65) Prior Publication Data

US 2024/0284094 A1 Aug. 22, 2024

Related U.S. Application Data

(63) Continuation of application No. PCT/CN2022/109282, filed on Jul. 30, 2022.

(30) Foreign Application Priority Data

Nov. 10, 2021 (CN) ........................ 202111330524.3

(51) Int. Cl.
*H04R 29/00* (2006.01)
*H04R 1/10* (2006.01)
(Continued)

(52) U.S. Cl.
CPC ......... *H04R 1/2811* (2013.01); *H04R 1/1041* (2013.01); *H04R 1/227* (2013.01); *H04R 29/001* (2013.01)

(58) Field of Classification Search
CPC .... H04R 1/2811; H04R 1/1041; H04R 1/227; H04R 29/001
(Continued)

(56) References Cited

U.S. PATENT DOCUMENTS 5,418,338 A * 5/1995 Kim ..................... H04R 1/2811 381/351
9,451,068 B2 * 9/2016 Warren .................. G02C 11/06
(Continued)

FOREIGN PATENT DOCUMENTS

CN 103428607 A 12/2013
CN 103945299 A 7/2014
(Continued)

OTHER PUBLICATIONS

First Office Action issued in Chinese Application No. 202111330524.3; mailed Dec. 19, 2022; 17 pgs.
(Continued)

*Primary Examiner* — Ammar T Hamid
(74) *Attorney, Agent, or Firm* — HAUPTMAN HAM, LLP

(57) ABSTRACT

Disclosed are a sound-producing apparatus, a calibration method for the sound-producing apparatus, and a sound-producing unit. The sound-producing apparatus includes two sound-producing units; each of the sound-producing units includes a cavity, a sound-producing unit body and an adjusting apparatus; the sound-producing unit body is provided in the cavity, and the cavity is separated into a front cavity and a rear cavity; the adjusting apparatus includes an adjusting plate and a driving portion; and one end of the adjusting plate is rotatably provided on an inner wall of the rear cavity, and the driving portion is configured to drive the adjusting plate to move so as to adjust an effective volume of the rear cavity.

19 Claims, 6 Drawing Sheets

(51) Int. Cl.
*H04R 1/22* (2006.01)
*H04R 1/28* (2006.01)

(58) Field of Classification Search
USPC ....................................................... 381/59, 56
See application file for complete search history.

(56) References Cited

U.S. PATENT DOCUMENTS

| | | | | |
|---|---|---|---|---|
| 2011/0235847 | A1 | 9/2011 | Bhutani et al. | |
| 2013/0266170 | A1* | 10/2013 | Yamagishi | H04R 1/2873 381/353 |

FOREIGN PATENT DOCUMENTS

| | | | |
|---|---|---|---|
| CN | 204859501 | U | 12/2015 |
| CN | 204948336 | U | 1/2016 |
| CN | 105992112 | A | 10/2016 |
| CN | 106028238 | A | 10/2016 |
| CN | 106303812 | A | 1/2017 |
| CN | 106686503 | A | 5/2017 |
| CN | 208891028 | U | 5/2019 |
| CN | 111479208 | A | 7/2020 |
| CN | 112584263 | A | 3/2021 |
| CN | 213818148 | U | 7/2021 |
| CN | 113470605 | A | 10/2021 |
| CN | 214381361 | U | 10/2021 |
| CN | 113993031 | A | 1/2022 |
| JP | 2018007221 | A | 1/2018 |
| WO | 2021052485 | A1 | 3/2021 |

OTHER PUBLICATIONS

Notification to Grant Patent Right for Invention issued in Chinese Application No. 202111330524.3; mailed May 29, 2023; 5 pgs.
International Search Report and Written Opinion issued in International Patent Application No. PCT/CN2022/109282; mailed Nov. 1, 2022; 16 pgs.

* cited by examiner

SOUND-PRODUCING APPARATUS, CALIBRATION METHOD FOR SOUND-PRODUCING APPARATUS, SOUND-PRODUCING UNIT AND HEADSET EQUIPMENT

CROSS-REFERENCE TO RELATED APPLICATIONS

The present disclosure is a continuation application of International Application No. PCT/CN2022/109282, filed on Jul. 30, 2022, which claims priority to Chinese Patent Application No. 202111330524.3, filed on Nov. 10, 2021. The disclosures of the above-mentioned applications are incorporated herein by reference in their entireties.

TECHNICAL FIELD

The present disclosure relates to the technical field of sound-producing apparatus, and in particular to a sound-producing apparatus, a calibration method for the sound-producing apparatus, a sound-producing unit, and a headset equipment.

BACKGROUND

Currently, there are more and more virtual reality (VR) and augmented reality (AR) products on the market, and people have higher and higher privacy requirements on the basis of meeting their daily needs. Currently, products on the market include commonly used far-field silencing solutions with a single sound-producing unit and far-field silencing solutions with dual sound-producing units. For dual sound-producing units, the difference in sound-producing units is inevitable, and the consistency of sound-producing units will directly affect the far-field silencing.

SUMMARY

The present disclosure provides a sound-producing apparatus, including two sound-producing units;

each of the sound-producing units includes a cavity, a sound-producing unit body and an adjusting apparatus;

the sound-producing unit body is provided in the cavity, and the cavity is separated into a front cavity and a rear cavity;

the adjusting apparatus includes an adjusting plate and a driving portion; and one end of the adjusting plate is rotatably provided on an inner wall of the rear cavity, and the driving portion is configured to drive the adjusting plate to move so as to adjust an effective volume of the rear cavity.

In an embodiment, in each of the sound-producing units, the inner wall of the rear cavity is provided with a plurality of sealing fitting portions on a rotation track of the adjusting plate, and the other end of the adjusting plate is configured to move to be sealingly connected with one of the sealing fitting portions.

In an embodiment, the plurality of the sealing fitting portions are provided at an included angle, the included angle between two adjacent sealing fitting portions is α, and α is greater than 0° and less than 90°.

In an embodiment, the plurality of the sealing fitting portions are provided at intervals according to a preset rotation angle of the adjusting plate.

In an embodiment, the plurality of the sealing fitting portions include a limiting portion close to one end of the front cavity, and the limiting portion is protrudingly provided on the inner wall of the rear cavity to limit a displacement of the adjusting plate.

In an embodiment, an angle between the adjusting plate and the inner wall of the rear cavity is adjustable, so as to adjust the rear cavity.

In an embodiment, a shape of the rear cavity is polygon.

In an embodiment, the adjusting plate is a telescopic plate with adjustable length, and a telescopic driving structure of the adjusting plate is electrically connected to a control apparatus; and after the adjusting plate moves to a designated position, two ends of the adjusting plate are telescopically adjusted to sealingly abut against corresponding inner walls.

In an embodiment, a plurality of plate segments are sleeved in sequence to achieve adjustable telescopicity by changing a distance between each of the plate segments; or two plate segments are connected through a flexible telescopic sleeve, and the adjustable telescopicity of the adjusting plate is achieved by directly stretching and compressing the telescopic sleeve.

In an embodiment, one end of the adjusting plate is provided at a middle of an inner wall of the rear cavity, and a plurality of sealing fitting portions are distributed on two adjacent inner walls of the rear cavity along a rotation track of the adjusting plate.

The present application also provides a calibration method for a sound-producing apparatus, the sound-producing apparatus includes two sound-producing units; each of the sound-producing units includes a cavity, a sound-producing unit body and an adjusting apparatus; the sound-producing unit body is provided in the cavity, and the cavity is separated into a front cavity and a rear cavity; the adjusting apparatus includes an adjusting plate and a driving portion; one end of the adjusting plate is rotatably provided on an inner wall of the rear cavity, and the driving portion is configured to drive the adjusting plate to move so as to adjust an effective volume of the rear cavity;

the calibration method for the sound-producing apparatus includes:

obtaining frequency response parameters of the two sound-producing units; and controlling the adjusting apparatus and/or an input voltage of at least one of the sound-producing units according to a differential value between the frequency response parameters to make the differential value between the frequency response parameters of the two sound-producing units be within a preset range.

In an embodiment, the frequency response parameters include a peak frequency and/or a valley impedance;

the obtaining frequency response parameters of the two sound-producing units includes:

in response to respectively playing frequency sweep signals at a rated voltage to the two sound-producing units, obtaining current signals returned by the two sound-producing units;

calculating to obtain impedance curves of the two sound-producing units according to the rated voltage and the two obtained current signals; and obtaining a peak frequency f01 and a peak frequency f02 of the two sound-producing units and/or a valley impedance Ze1 and a valley impedance Ze2 of the two sound-producing units according to the two impedance curves.

In an embodiment, the frequency response parameter includes a peak frequency;

the controlling the adjusting apparatus and/or the input voltage of at least one of the sound-producing units according to the differential value between the frequency response parameters to make the differential value between the frequency response parameters of the two sound-producing units be within the preset range includes:

comparing the peak frequency f01 and the peak frequency f02 of the two sound-producing units to obtain a peak frequency differential value; and controlling the adjusting apparatus of at least one sound-producing unit according to the peak frequency differential value to make the peak frequency differential value between the two sound-producing units be within the preset range.

In an embodiment, the frequency response parameter includes a valley impedance;

the controlling the adjusting apparatus and/or the input voltage of at least one of the sound-producing units according to the differential value between the frequency response parameters to make the differential value between the frequency response parameters of the two sound-producing units be within the preset range includes:

comparing the valley impedance Ze1 and the valley impedance Ze2 of the two sound-producing unit to obtain a valley impedance differential value; and controlling the input voltage of at least one of the sound-producing units according to the valley impedance differential value and a preset mapping relationship to make the valley impedance differential value between the two sound-producing units be within the preset range.

In an embodiment, the controlling the adjusting apparatus of at least one sound-producing unit according to the peak frequency differential value to make the peak frequency differential value between the two sound-producing units be within the preset range includes:

obtaining an effective volume size of the rear cavity of the sound-producing unit that needs to be adjusted according to the peak frequency differential value and a preset mapping relationship; and controlling the corresponding driving portion to drive the adjusting plate to move according to the obtained effective volume size of the rear cavity, and adjusting the effective volume of the corresponding rear cavity.

In an embodiment, the controlling the corresponding driving portion to drive the adjusting plate to move according to the obtained effective volume size of the rear cavity, and adjusting the effective volume of the corresponding rear cavity includes:

determining a sealing fitting portion corresponding to the effective rear cavity volume size according to the obtained effective volume size of the rear cavity; and controlling the corresponding driving portion to drive the adjusting plate to move to sealingly cooperate with the determined sealing fitting portion, and completing the adjustment of the effective volume of the rear cavity.

The present application also provides a sound-producing unit, including:

a cavity;

a sound-producing unit body; and an adjusting apparatus;

the sound-producing unit body is provided in the cavity and the cavity is separated into a front cavity and a rear cavity; the adjusting apparatus includes an adjusting plate and a driving portion, and one end of the adjusting plate is rotatably provided on an inner wall of the rear cavity; the driving portion is configured to drive the adjusting plate to move so as to adjust an effective volume of the rear cavity.

The present application also provides a headset equipment, including:

a wearing body; and a supporting portion extending backward from two ends of the wearing body;

the supporting portion includes at least one sound-producing unit.

In an embodiment, two sound-producing units are provided at intervals in a same housing, and rear cavities of the two sound-producing units are on a same side of the housing facing away from user's ears.

In an embodiment, the two sound-producing units are in a same phase mode.

In the technical solution of the present disclosure, the sound-producing apparatus includes two sound-producing units. Due to the difference in the factory frequency response of the two sound-producing units, the resonance peaks and sensitivities of the two sound-producing units are different, so that the silencing effect is affected when using the sound-producing apparatus. In each of the sound-producing units, the adjusting plate divides the rear cavity into two independent chambers, and the volume of the chamber corresponding to the chamber at the front cavity is the effective volume. The rear cavity can be adjusted by adjusting the angle between the adjusting plate and the inner wall surface on which it is installed. The effective volumes of the rear cavities of the two sound-producing units can both be adjusted by the adjusting apparatus, so that the frequency response of the sound-producing unit and another sound-producing unit is within a certain error range and has good consistency. In this way, the far-field silencing effect of the two sound-producing units are better during operation, so that the sound-producing apparatus can obtain the better sound quality effects and improve the user's experience.

BRIEF DESCRIPTION OF THE DRAWINGS

In order to illustrate the technical solutions in the embodiments of the present disclosure or in the related art more clearly, the following briefly introduces the accompanying drawings required for the description of the embodiments or the related art. Obviously, the drawings in the following description are only part of embodiments of the present disclosure. For those skilled in the art, other drawings can also be obtained according to the structures shown in these drawings without any creative effort.

Figure 1:
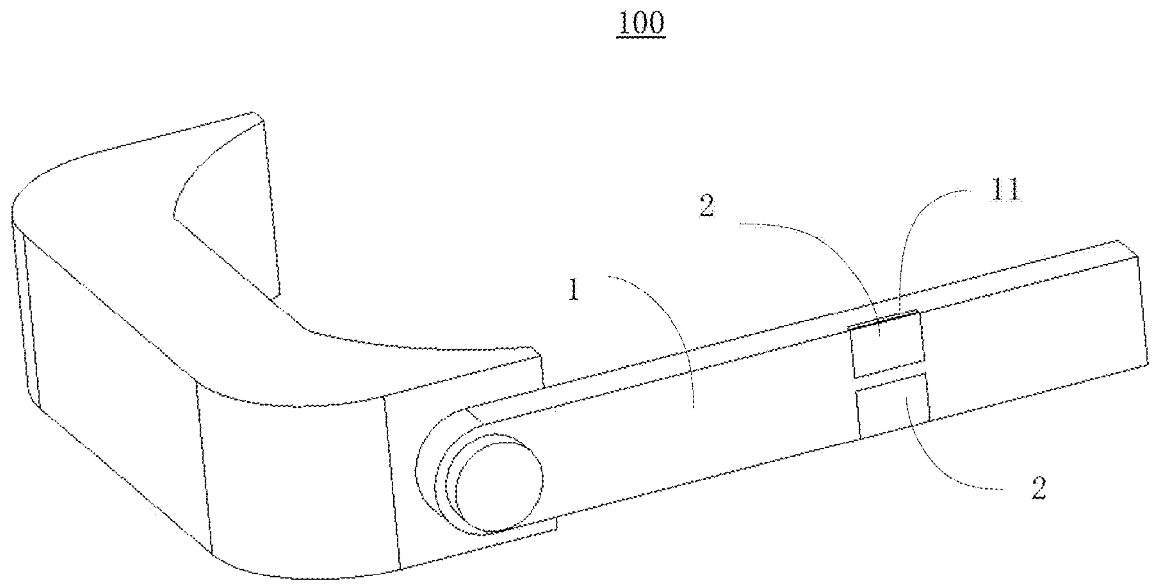
FIG. 1 is a three-dimensional schematic view of a sound-producing apparatus according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described below with reference to the accompanying drawings. It is obvious that the embodiments to be described are only some rather than all of the embodiments of the present disclosure. All other embodiments obtained by those skilled in the art based on the embodiments of the present disclosure without creative efforts shall fall within the scope of the present disclosure.

It should be noted that all directional indications (such as up, down, left, right, front, back, etc.) in the embodiments of the present disclosure are only used to explain the relative positional relationship, the movement situation, etc. among various assemblies under a certain posture as shown in the drawings. If the specific posture changes, the directional indication also changes accordingly.

In addition, the descriptions of "first", "second", etc. are only for the purpose of description, and should not be construed as indicating or implying relative importance or implicitly indicating the number of technical features indicated. Thus, a feature delimited with "first", "second" may expressly or implicitly include at least one of that feature. Besides, the meaning of "and/or" appearing in the disclosure includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present disclosure.

Currently, there are more and more virtual reality (VR) and augmented reality (AR) products on the market, and people have higher and higher privacy requirements on the basis of meeting their daily needs. Currently, products on the market include commonly used far-field silencing solutions with a single sound-producing unit and far-field silencing solutions with dual sound-producing units. For dual sound-producing units, the difference in sound-producing units is inevitable, and the consistency of sound-producing units will directly affect the far-field silencing.

Figure 2:
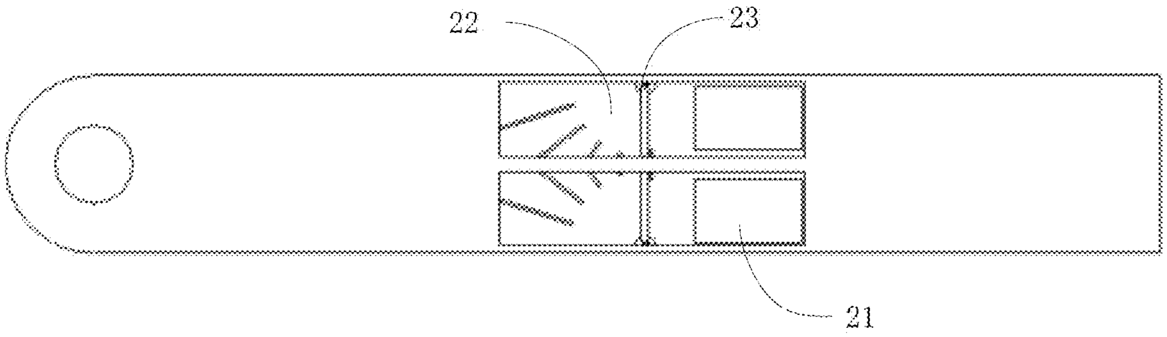
FIG. 2 is a partial cross-sectional view in FIG. 1.
Figure 3:
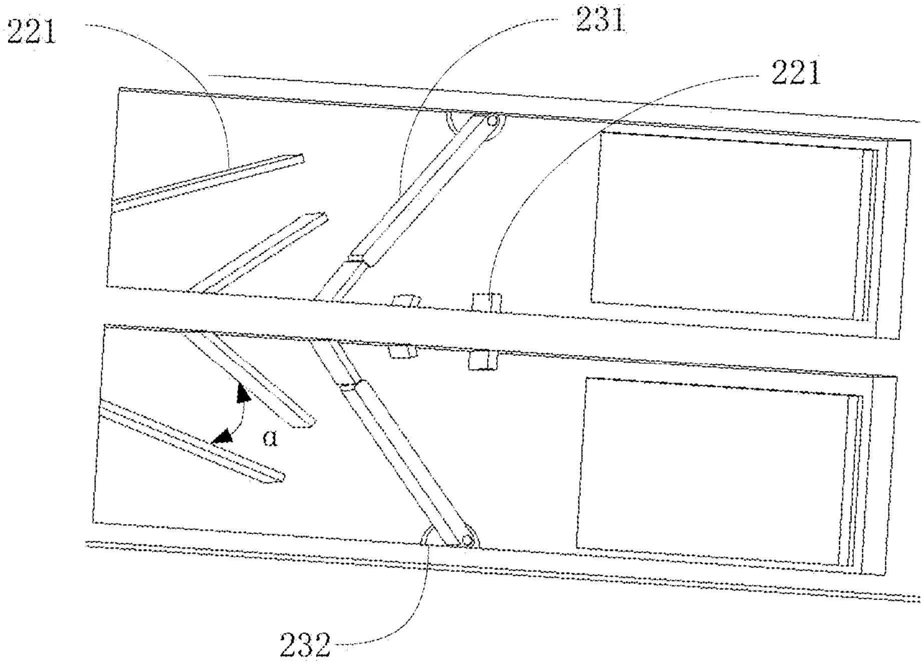
FIG. 3 is an enlarged view of a rear cavity in FIG. 2.
Figure 4:
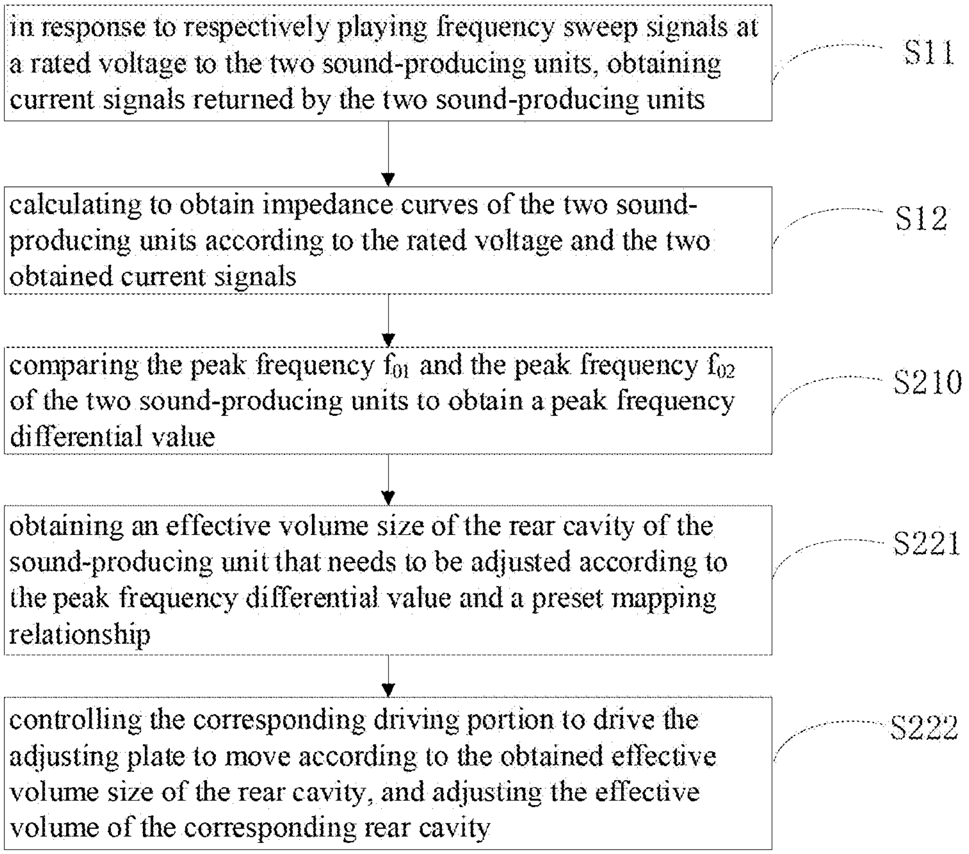
FIG. 4 is a flowchart of a calibration method for the sound-producing apparatus according to an embodiment of the present disclosure.
Figure 5:
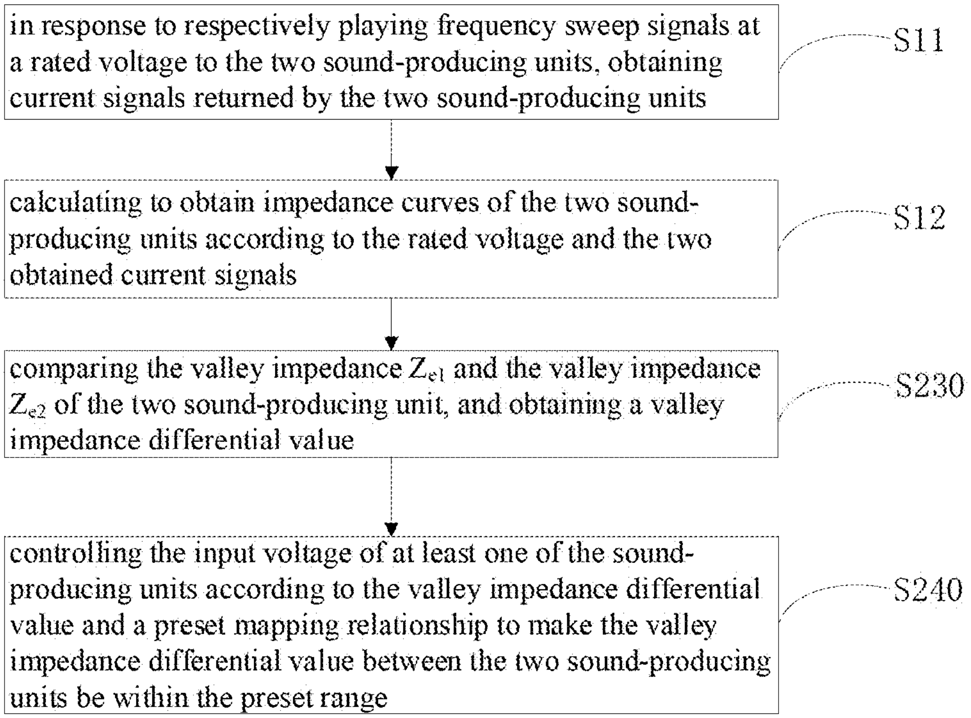
FIG. 5 is a flowchart of a calibration method for the sound-producing apparatus according to an embodiment of the present disclosure.
Figure 6:
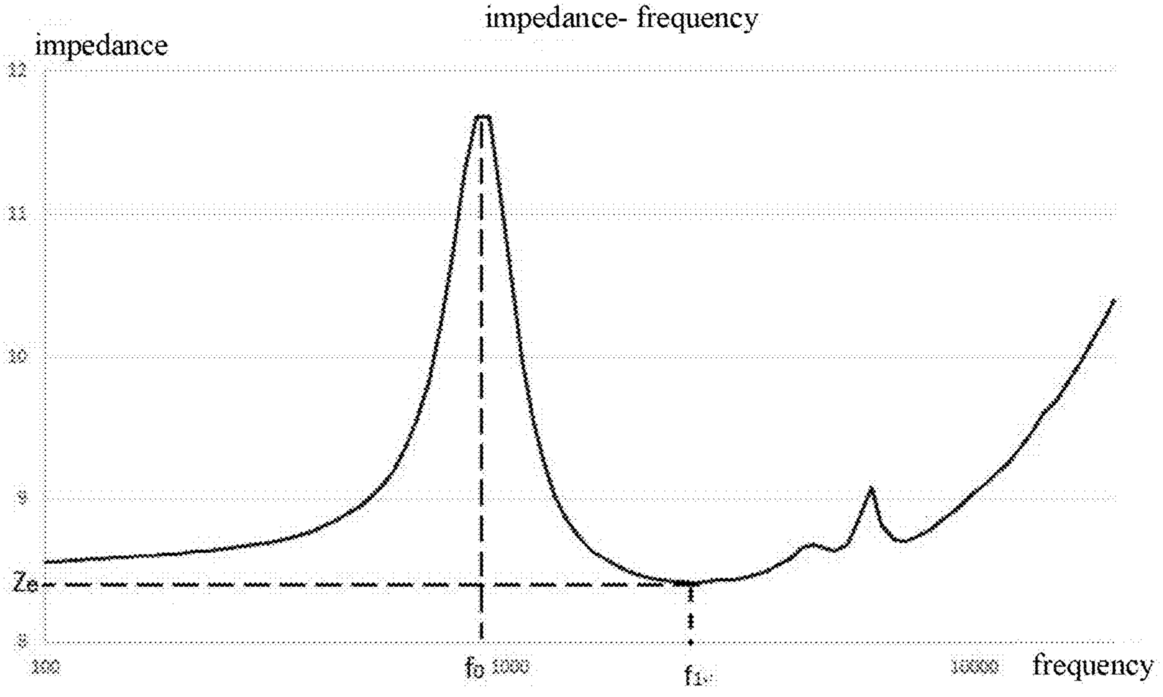
FIG. 6 is an impedance curve view in FIG. 4.

In view of this, the present disclosure provides a sound-producing apparatus, a calibration method for the sound-producing apparatus and a sound-producing unit. FIG. 1 to FIG. 3 are embodiments of the sound-producing apparatus provided by the present disclosure. FIG. 4 to FIG. 6 are embodiments of the calibration method for the sound-producing apparatus provided by the present disclosure.

The present disclosure provides a sound-producing unit 2, including a cavity, a sound-producing unit body and an adjusting apparatus 23. The sound-producing unit body is provided in the cavity, and the cavity is spaced into a front cavity 21 and a rear cavity 22. The adjusting apparatus 23 is configured to adjust an effective volume size of the rear cavity 22. The adjusting apparatus 23 includes an adjusting plate 231 and a driving portion 232, the adjusting plate 231 is movably provided on the rear cavity 22, so as to adjust the effective volume of the rear cavity 22 during the movable stroke, and the driving portion 232 drives the adjusting plate 231 to move. Therefore, through the driving cooperation of the driving portion 232 and the adjusting plate 231, the effective volume of the rear cavity 22 of the sound-producing unit 2 can be adjusted, and the effective volume of the rear cavity 22 refers to the volume of the rear cavity 22 corresponding to a sealed part of the front cavity 21. In this way, a frequency response effect of the sound-producing unit 2 can be changed by adjusting the effective volume of the rear cavity 22, thereby correspondingly changing the far-field silencing effect.

The present disclosure also provides a sound-producing apparatus 100. Please referring to FIG. 1 to FIG. 2, the sound-producing apparatus 100 includes two sound-producing units 2 and a control apparatus. Each of the sound-producing units 2 includes the cavity, the sound-producing unit body and the adjusting apparatus 23. The sound-producing unit body is provided in the cavity and the cavity is separated to be the front cavity 21 and the rear cavity 22. The adjusting apparatus 23 includes an adjusting plate 231 and a driving portion 232, one end of the adjusting plate 231 is rotatably provided on an inner wall of the rear cavity 22, and the driving portion 232 drives the adjusting plate 231 to move to adjust the effective volume of the rear cavity 22.

In the technical solution of the present disclosure, the adjusting plate 231 divides the rear cavity 22 into two independent chambers, and the volume of the chamber corresponding to the front cavity 21 is the effective volume. The rear cavity 22 can be adjusted by adjusting the angle between the adjusting plate 231 and an inner wall on which the adjusting plate 231 is installed. The effective volumes of the rear cavity 22 of the two sound-producing units 2 can be adjusted through the adjusting apparatus 23, so that the frequency response of the sound-producing unit 2 and another sound-producing unit 2 is in a certain error range and has good consistency, and the far-field silencing effect of the two sound-producing units 2 is good during operation.

The sound-producing apparatus 100 also includes a control apparatus electrically connected to the two sound-producing units 2. The control apparatus includes a memory, a processor, and a calibration program for the sound-producing apparatus stored in the memory. The calibration program for the sound-producing apparatus is executed by the processor. Therefore, when the processor executes the calibration program for the sound-producing apparatus, a control instruction can be issued to one of the sound-producing units 2, so that the control apparatus controls the adjusting apparatus 23 in the corresponding sound-producing unit 2 to change the effective volume size of the corresponding rear cavity 22. Specifically, according to the control instruction of the control apparatus, the driving portion 232 is controlled to drive the adjusting plate 231 to move in the direction of increasing the effective volume of the rear cavity 22 or decreasing the effective volume of the rear cavity 22, so that the adjusting plate 231 divides the rear cavity 22, and the cavity corresponding to the front cavity 21 is an effective cavity.

It should be noted that the driving portion 232 can be a motor, a screw mechanism, etc., which is not limited here. In this embodiment, the driving portion 232 is a motor.

Furthermore, considering that the shape of the rear cavity 22 may be a polygon rather than a circle, the adjusting plate 231 cannot effectively cooperate with the inner walls of the rear cavity 22. Therefore, in an embodiment, the adjusting plate 231 is a telescopic plate with adjustable length, and the telescopic driving structure of the adjusting plate 231 is electrically connected to the control apparatus. Therefore, after the adjusting plate 231 moves to a designated position, two ends of the adjusting plate 231 can be telescopically adjusted to sealingly abut against the corresponding inner wall to ensure the sealing of the rear cavity 22. It should be noted that multiple plate segments can be sleeved in sequence to achieve adjustable telescopicity by changing the distance between each other, or two plate segments can be connected through a flexible telescopic sleeve, and the adjustable telescopicity of the adjusting plate 231 can be achieved by directly stretching and compressing the telescopic sleeve, which will not be explained in detail here.

In other embodiments, please referring to FIG. 2 to FIG. 3, one end of the adjusting plate 231 is rotatably provided on an inner wall of the rear cavity 22, and the inner wall of the rear cavity 22 is provided with a plurality of sealing fitting portions 221 on a rotation track of the adjusting plate 231. The other end of the adjusting plate 231 can move to be sealingly connected with one of the sealing fitting portions 221. The plurality of sealing fitting portions 221 divide the rear cavity 22 into multiple levels. When the adjusting plate 231 is sealingly connected to different sealing fitting portions 221, effective volumes of different sizes are formed respectively, so that when the adjusting plate 231 is adjusted, it is easier to confirm the required movement position, thereby enhancing the accuracy and convenience of adjusting the effective volume.

Based on the above embodiment, one end portion of the adjusting plate 231 is rotatably installed on the inner wall of the rear cavity 22, and the rotation track of the other end of the adjusting plate 231 is an arc shape. Therefore, in order to facilitate cooperation, the plurality of the fitting portions 221 are arranged at an included angle, and the included angle between two adjacent sealing fitting portions 221 is a, where a is greater than 0° and less than 90°.

Further, the plurality of the sealing fitting portions 221 are arranged at intervals according to the preset rotation angle of the adjusting plate 231. In this embodiment, the single preset rotation angle of the adjusting plate 231 is set to 15°, that is, a is 15°. The volume of the rear cavity 22 is divided into 6 levels with each level as 15°. When the level is converted, the control apparatus issues instructions to the driving portion 232, thereby driving the adjusting plate 231 to rotate at a corresponding angle to contact the sealing fitting portion 221 of the corresponding level, forming a sealing environment, and changing the effective volume. In this embodiment, when the adjusting plate 231 rotates more than 75°, the rear cavity 22 is fully connected. At this time, the effective volume is the volume of the rear cavity 22. This level is recorded as a first level. When the adjusting plate 231 is in an initial vertical state and contacts the corresponding sealing fitting portion 221, the corresponding effective volume is the smallest at this time, which is recorded as a sixth level.

It should be noted that a rubber member may be provided at the end portion of the adjusting plate 231 or the end portion of the sealing fitting portion 221 to ensure a good sealing effect.

The plurality of sealing fitting portions 221 include a limiting portion close to one end of the front cavity 21, and the limiting portion protrudes from the inner wall of the rear cavity 22 to limit the displacement of the adjusting plate 231. This prevents the adjusting plate 231 from exceeding the preset stroke due to excessive driving force of the driving portion, causing the level positioning to no longer be accurate and affecting the intelligent adjustment of the effective volume.

In this embodiment, one end of the adjusting plate 231 is installed in a middle of the inner wall of the rear cavity 22, and a plurality of sealing fitting portions 221 are distributed on two adjacent inner wall surfaces in the rear cavity 22 along the rotation track of the adjusting plate 231. One of the inner wall surfaces on which the sealing fitting portion 221 is installed corresponds to the inner wall surface on which the adjusting plate 231 is installed. At this time, the length of the plurality of sealing fitting portions 221 can be the same, and the length of the adjusting plate 231 is telescopically adjustable, or the length of the plurality of sealing fitting portions 221 can increase along the rotation track of the adjusting plate 231, and the length of the adjusting plate 231 is fixed to achieve sealing fit at each level.

Furthermore, the two sound-producing units 2 in the sound-producing apparatus 100 can be located inside the same housing, or can be placed in two housings respectively. In this embodiment, the two sound-producing units 2 are installed at intervals in the same housing 1, and the rear cavities 22 of the two sound-producing units 2 are on the same side of the housing 1 facing away from the user's ears. The sound-producing hole 11 in the sound-producing unit 2 is communicated with the front cavity 21, so that the sound-producing holes 11 of both sound-producing units 2 emit sound to one side of the user.

The following are the steps in the control apparatus where the processor executes the calibration method for the sound-producing apparatus in the calibration program of the sound-producing apparatus.

The calibration method for the sound-producing apparatus includes the following steps:

S10, obtaining frequency response parameters of the two sound-producing unit 2;

S20, controlling the adjusting apparatus 23 and/or an input voltage of at least one of the sound-producing units 2 according to a differential value between the frequency response parameters to make the differential value between the frequency response parameters of the two sound-producing units 2 be within a preset range.

In the technical solution of the present disclosure, the sound-producing apparatus 100 includes two sound-producing units 2. Due to the difference in the factory frequency response of the two sound-producing units 2, the resonance peaks and sensitivities of the two sound-producing units 2 are different, thus affecting the silencing effect when the sound-producing apparatus 100 is used. According to the obtained frequency response parameters of the two sound-producing units 2 and the differential value between the frequency response parameters, at least the adjusting apparatus 23 of at least one sound-producing unit 2 to correspondingly adjust the volume of the rear cavity 22 of the sound-producing unit 2, or to adjust the input voltage corresponding to the sound-producing unit 2, or to simultaneously adjust the volume of the rear cavity 22 and the input voltage, so that the differential value between the frequency response parameters of the two sound-producing unit 2 is within the preset range. In this way, the consistency of the two sound-producing units 2 is better, thereby having a better far-field silencing effect, so that the sound-producing apparatus 100 can obtain a better sound quality effects and improve user experience.

It should be noted that the preset range is set according to the effect to be achieved. For example, initially, the differential value between the frequency response parameters of the two sound-producing units 2 is 10%, and the error differential value between them is 5%. At this time, the sound-producing unit 2 with a higher frequency response parameter value can be adjusted to a lower value as needed, or the other one can be adjusted conversely, which is not limited here.

Specifically, the frequency response parameters include a peak frequency and/or a valley impedance;

The step of obtaining frequency response parameters of the two sound-producing unit 2 includes:

S11, in response to respectively playing frequency sweep signals at a rated voltage to the two sound-producing units 2, obtaining current signals returned by the two sound-producing units 2;

S12, calculating to obtain impedance curves of the two sound-producing units 2 according to the rated voltage and the two obtained current signals;

S13, obtaining a peak frequency $f_{01}$ and a peak frequency $f_{02}$ of the two sound-producing units 2 and/or a valley impedance $Z_{e1}$ and a valley impedance $Z_{e2}$ of the two sound-producing units according to the two impedance curves.

It should be noted that, please referring to FIG. 6, the peak frequency $f_0$ marked in the impedance curve can be adjusted by adjusting the effective volume of the rear cavity 22 of the corresponding sound-producing unit 2. Specifically, reducing the effective volume of the corresponding sound-producing unit 2 will increase the peak frequency $f_0$, and increasing the effective volume of the corresponding sound-producing unit 2 will decrease the peak frequency $f_0$. Decreasing the input voltage of the corresponding sound-producing unit 2 will cause $Z_e$ to move up, and increasing the input voltage of the corresponding sound-producing unit will cause $Z_e$ to move down.

Further, please referring to FIG. 4, in an embodiment, the frequency response parameter includes the peak frequency;

Step S20 includes:

S210, comparing the peak frequency f01 and the peak frequency f02 of the two sound-producing units 2 to obtain a peak frequency differential value;

S220, controlling the adjusting apparatus 23 of at least one sound-producing unit 2 according to the peak frequency differential value to make the peak frequency differential value between the two sound-producing units 2 be within the preset range.

It should be noted that, in this embodiment, the effective volume of the corresponding rear cavity 22 of the sound-producing unit 2 is adjusted according to the peak frequency differential value. At this time, only the consistency of the peak frequencies of the two sound-producing units 2 is changed.

Further, step S220 specifically includes the following steps:

S221, obtaining an effective volume size of the rear cavity of the sound-producing unit 2 that needs to be adjusted according to the peak frequency differential value and a preset mapping relationship;

S222, controlling the corresponding driving portion 232 to drive the adjusting plate 231 to move according to the obtained effective volume size of the rear cavity, and adjusting the effective volume of the corresponding rear cavity 22.

It should be noted that according to the above-mentioned sound-producing apparatus 100, in the embodiment where the adjusting plate 231 and the rear cavity 22 inner wall cooperate with each other, the adjustment is controlled according to the specific embodiment.

Further, in an embodiment of the sound-producing apparatus 100 of the present disclosure, the inner wall of the rear cavity 22 is provided with a plurality of sealing fitting portions 221 on the rotation track of the adjusting plate 231. The other end of the adjusting plate 231 can move to be sealingly connected with one of the sealing fitting portions 221 to adjust the effective volume. In this embodiment, the plurality of sealing fitting portions 221 respectively correspond to various levels of effective volume. Step S222 includes:

determining a sealing fitting portion 221 corresponding to the effective rear cavity volume size according to the obtained effective volume size of the rear cavity;

controlling the corresponding driving portion 232 to drive the adjusting plate 231 to move to sealingly cooperate with the determined sealing fitting portion 221, and completing the adjustment of the effective volume of the rear cavity 22.

It should be noted that the level can be determined according to the effective volume size of the rear cavity, thereby determining the sealing fitting portion 221 used in this level state, so that a precise rotation angle range instruction can be directly issued, and the control and adjustment process is more concise and reduces errors.

Further, please referring to FIG. 5, in an embodiment, the frequency response parameter includes the valley impedance. At this time, step S20 includes:

S230, comparing the valley impedance $Z_{e1}$ and the valley impedance $Z_{e2}$ of the two sound-producing unit 2, and obtaining a valley impedance differential value;

S240, controlling the input voltage of at least one of the sound-producing units 2 according to the valley impedance differential value and a preset mapping relationship to make the valley impedance differential value between the two sound-producing units 2 be within the preset range.

It should be noted that, in this embodiment, the input voltage of the corresponding sound-producing unit 2 is adjusted according to the valley impedance differential value. At this time, only the consistency of the valley impedance of the two sound-producing units 2 is changed.

Further, the calculated impedance curve of the two sound-producing unit 2 can correspond to the peak frequency $f_{01}$ the valley impedance $Z_{e1}$, the peak frequency $f_{02}$, and the valley impedance $Z_{e3}$ of each sound-producing unit 2. The peak frequency differential value and the valley impedance differential value can be obtained after a comparison. The volume of the rear cavity and/or the input voltage of the sound-producing unit 2 are correspondingly adjusted according to the two differential values. Specifically, when it is necessary to control the adjustment apparatus 23 and the input voltage at the same time, the sound-producing unit 2 that adjusts the effective volume of the rear cavity 22 and the sound-producing unit 2 that adjusts the input voltage can be the same one, or can be two, which is not limited here, as long as to be determined according to the actual differential value and the need for far-field silencing effect.

The principle that the far-field silencing of sound-producing unit 2 can be adjusted by adjusting the peak frequency $f_0$ and the valley impedance $Z_e$ is as follows:

the sound-producing unit body, taking the speaker as an example, the total impedance $Z_{eM}$ of the speaker is a ratio of the voltage at both ends of the voice coil to the current flowing through the voice coil. The value is determined by the following formula:

$$Z_{eM} = R_e + jwL_E + \frac{B^2L^2}{(R_{MS} + R_{MR}) + j\ (wM_{MS}) - \frac{1}{wC_{MS}^2}}$$

In response to w is equal to 0, the total electrical impedance $Z_{eM}$ is equal to the voice coil direct current (DC)

resistance. As the frequency increases, the total impedance has a maximum value at the mechanical resonance frequency of the vibrating system. That is, the inertial impedance at this time is equal to the compliant impedance of the support:

$$w_0 M_{MS} = \frac{1}{w_0 * C_{MS}}$$

$$f_0 = \frac{1}{2\pi\sqrt{C_{MS} M_{MS}}}$$

under this circumstance:

$$Z_{eM} = R_e + jw_0 L_e + \frac{B^2 L^2}{R_{MS} + R_{MR}}$$

If the resonant sound of the vibrating system is in the low frequency region, then the $w_0L_e$ and the $R_{MR}$ can be omitted, and the formula can be simplified as:

$$Z_{eM\,0} = R_e + \frac{B^2 L^2}{R_{MS}}$$

Since $B^2L^2/R_{MS} >> R_e$, when the angular frequency is $w_0$, the impedance can be approximated as:

$$Z_{eM\,0} \approx \frac{B^2 L^2}{R_{MS}}$$

At higher frequencies, the compliant impedance and the mechanical loss can be ignored because they are significantly smaller than the inertial reactance, thus $$Z_{eM} = R_e + j\left(w_0 L_e - \frac{B^2 L^2}{w * R_{MS}}\right)$$

The total impedance is approximately equal to the DC resistance in response to $$w_1 L_e = \frac{B^2 L^2}{w_1 * R_{MS}}$$

The $f_1$ frequency is called the electric resonance frequency. The impedance at this time is the nominal impedance of the speaker. Usually, the nominal impedance is about 1.1~1.2 times the DC impedance. At higher frequencies, the total impedance increases due to the influence of the voice coil inductance and the reduction of the insertion impedance.

The frequency characteristics of the total impedance $Z_{eM}$ are shown in FIG. 6. The abscissa in the figure is the frequency, and the left side is the impedance. The frequency corresponding to the highest point of the curve is $f_0$. The parameter can be changed by adjusting the volume of the rear cavity. The total impedance corresponding to the lowest point after the curve passes the peak value is the DC impedance $Z_e$. The parameter can be adjusted by adjusting the input voltage.

In summary, the difference between the sound-producing units can be intuitively reflected in the impedance curve, and adjusting the volume of the rear cavity and the voltage can change the $f_0$ and the $Z_e$ in the impedance curve, thereby making the impedance curves of the two sound-producing units consistent, so as to achieve the calibration effect.

It should be noted that the above formulas are all from "Speaker Design and Production" edited by Yu Jinyuan and published by Guangdong Science and Technology Press in 2007. The present disclosure also provides a headset equipment, including a wearing body and a supporting portion extending backward from two ends of the wearing body. The supporting portion includes at least one sound-producing unit 2.

In an embodiment, the two sound-producing units 2 are installed at intervals in the same housing 1, and the rear cavities 22 of the two sound-producing units 2 are on the same side of the housing 1 facing away from the user's ears.

Since the effective volume of the rear cavity 22 is adjustable, the two sound-producing units 2 can be adjusted to the same phase mode without considering the far-field silencing. In this state, when it needs to obtain a better low frequency performance, the effective volume in the rear cavity 22 of the two sound-producing unit 2 can be adjusted to the first level. As the effective volume increases, the better low-frequency experience will be obtained.

The above descriptions are only embodiments of the present disclosure, and are not intended to limit the scope of the present disclosure. Under the inventive concept of the present disclosure, any equivalent structural transformations made by using the contents of the description and drawings of the present disclosure, or direct/indirect disclosures in other related technical fields, are included in the scope of the present disclosure.

What is claimed is:

1. A sound-producing apparatus, comprising:

two sound-producing units;

wherein each of the sound-producing units comprises a cavity, a sound-producing unit body and an adjusting apparatus;

the sound-producing unit body is provided in the cavity, and the cavity is separated into a front cavity and a rear cavity;

the adjusting apparatus comprises an adjusting plate and a driving portion; and one end of the adjusting plate is rotatably provided on an inner wall of the rear cavity, and the driving portion is configured to drive the adjusting plate to move so as to adjust an effective volume of the rear cavity;

wherein in each of the sound-producing units, the inner wall of the rear cavity is provided with a plurality of sealing fitting portions on a rotation track of the adjusting plate, and the other end of the adjusting plate is configured to move to be sealingly connected with one of the sealing fitting portions.

2. The sound-producing apparatus according to claim 1, wherein the plurality of the sealing fitting portions is provided at an included angle, the included angle between two adjacent sealing fitting portions is α, and α is greater than 0° and less than 90°.

3. The sound-producing apparatus according to claim 1, wherein the plurality of the sealing fitting portions is provided at intervals according to a preset rotation angle of the adjusting plate.

4. The sound-producing apparatus according to claim 1, wherein the plurality of the sealing fitting portions comprises a limiting portion close to one end of the front cavity, and the limiting portion is protrudingly provided on the inner wall of the rear cavity to limit a displacement of the adjusting plate.

5. The sound-producing apparatus according to claim 1, wherein an angle between the adjusting plate and the inner wall of the rear cavity is adjustable, so as to adjust the rear cavity.

6. The sound-producing apparatus according to claim 1, wherein a shape of the rear cavity is polygon.

7. The sound-producing apparatus according to claim 1, wherein the adjusting plate is a telescopic plate with adjustable length, and a telescopic driving structure of the adjusting plate is electrically connected to a control apparatus; and after the adjusting plate moves to a designated position, two ends of the adjusting plate are telescopically adjusted to sealingly abut against corresponding inner walls.

8. The sound-producing apparatus according to claim 7, wherein a plurality of plate segments are sleeved in sequence to achieve adjustable telescopicity by changing a distance between each of the plate segments; or two plate segments are connected through a flexible telescopic sleeve, and the adjustable telescopicity of the adjusting plate is achieved by directly stretching and compressing the telescopic sleeve.

9. The sound-producing apparatus according to claim 1, wherein one end of the adjusting plate is provided at a middle of an inner wall of the rear cavity, and a plurality of sealing fitting portions are distributed on two adjacent inner walls of the rear cavity along a rotation track of the adjusting plate.

10. A calibration method for a sound-producing apparatus, wherein the sound-producing apparatus comprises two sound-producing units; each of the sound-producing units comprises a cavity, a sound-producing unit body and an adjusting apparatus; the sound-producing unit body is provided in the cavity, and the cavity is separated into a front cavity and a rear cavity; the adjusting apparatus comprises an adjusting plate and a driving portion; one end of the adjusting plate is rotatably provided on an inner wall of the rear cavity, and the driving portion is configured to drive the adjusting plate to move so as to adjust an effective volume of the rear cavity;

the calibration method for the sound-producing apparatus comprises:

obtaining frequency response parameters of the two sound-producing units; and controlling the adjusting apparatus and/or an input voltage of at least one of the sound-producing units according to a differential value between the frequency response parameters to make the differential value between the frequency response parameters of the two sound-producing units be within a preset range.

11. The calibration method for the sound-producing apparatus according to claim 10, wherein the frequency response parameters comprise a peak frequency and/or a valley impedance;

the obtaining frequency response parameters of the two sound-producing units comprises:

in response to respectively playing frequency sweep signals at a rated voltage to the two sound-producing units, obtaining current signals returned by the two sound-producing units;

calculating to obtain impedance curves of the two sound-producing units according to the rated voltage and the two obtained current signals; and obtaining a peak frequency $f_{01}$ and a peak frequency $f_{02}$ of the two sound-producing units and/or a valley impedance $Z_{e1}$ and a valley impedance $Z_{e2}$ of the two sound-producing units according to the two impedance curves.

12. The calibration method for the sound-producing apparatus according to claim 10, wherein the frequency response parameter comprises a peak frequency;

the controlling the adjusting apparatus and/or the input voltage of at least one of the sound- producing units according to the differential value between the frequency response parameters to make the differential value between the frequency response parameters of the two sound-producing units be within the preset range comprises:

comparing the peak frequency $f_{01}$ and the peak frequency $f_{02}$ of the two sound-producing units to obtain a peak frequency differential value; and controlling the adjusting apparatus of at least one sound-producing unit according to the peak frequency differential value to make the peak frequency differential value between the two sound-producing units be within the preset range.

13. The calibration method for the sound-producing apparatus according to claim 10, wherein the frequency response parameter comprises a valley impedance;

the controlling the adjusting apparatus and/or the input voltage of at least one of the sound-producing units according to the differential value between the frequency response parameters to make the differential value between the frequency response parameters of the two sound-producing units be within the preset range comprises:

comparing the valley impedance $Z_{e1}$ and the valley impedance $Z_{e2}$ of the two sound-producing unit to obtain a valley impedance differential value; and controlling the input voltage of at least one of the sound-producing units according to the valley impedance differential value and a preset mapping relationship to make the valley impedance differential value between the two sound-producing units be within the preset range.

14. The calibration method for the sound-producing apparatus according to claim 12, wherein the controlling the adjusting apparatus of at least one sound-producing unit according to the peak frequency differential value to make the peak frequency differential value between the two sound-producing units be within the preset range comprises:

obtaining an effective volume size of the rear cavity of the sound-producing unit that needs to be adjusted according to the peak frequency differential value and a preset mapping relationship; and controlling the corresponding driving portion to drive the adjusting plate to move according to the obtained effective volume size of the rear cavity, and adjusting the effective volume of the corresponding rear cavity.

15. The calibration method for the sound-producing apparatus according to claim 14, wherein the controlling the corresponding driving portion to drive the adjusting plate to move according to the obtained effective volume size of the rear cavity, and adjusting the effective volume of the corresponding rear cavity comprises:

determining a sealing fitting portion corresponding to the effective rear cavity volume size according to the obtained effective volume size of the rear cavity; and controlling the corresponding driving portion to drive the adjusting plate to move to sealingly cooperate with the determined sealing fitting portion, and completing the adjustment of the effective volume of the rear cavity.

16. A sound-producing unit, comprising:

a cavity;

a sound-producing unit body; and an adjusting apparatus;

wherein the sound-producing unit body is provided in the cavity and the cavity is separated into a front cavity and a rear cavity; the adjusting apparatus comprises an adjusting plate and a driving portion, and one end of the adjusting plate is rotatably provided on an inner wall of the rear cavity; the driving portion is configured to drive the adjusting plate to move so as to adjust an effective volume of the rear cavity;

wherein in each of the sound-producing units, the inner wall of the rear cavity is provided with a plurality of sealing fitting portions on a rotation track of the adjusting plate, and the other end of the adjusting plate is configured to move to be sealingly connected with one of the sealing fitting portions.

17. A headset equipment, comprising:

a wearing body; and a supporting portion extending backward from two ends of the wearing body;

wherein the supporting portion comprises at least one sound-producing unit according to claim 16.

18. The headset equipment according to claim 17, wherein two sound-producing units are provided at intervals in a same housing, and rear cavities of the two sound-producing units are on a same side of the housing facing away from user's ears.

19. The headset equipment according to claim 18, wherein the two sound-producing units are in a same phase mode.

* * * * *